United States Patent
Ataee et al.

(10) Patent No.: US 10,969,813 B2
(45) Date of Patent: Apr. 6, 2021

(54) MAXIMUM POWER DETECTION FOR POWERED DEVICES

(71) Applicant: Arista Networks, Inc., Santa Clara, CA (US)

(72) Inventors: Mehran Ataee, Santa Clara, CA (US); Peter Parkinson, Santa Clara, CA (US); Kumar Narayanan, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 85 days.

(21) Appl. No.: 16/384,021

(22) Filed: Apr. 15, 2019

(65) Prior Publication Data

US 2020/0326740 A1    Oct. 15, 2020

(51) Int. Cl.
   *G05F 3/02* (2006.01)
(52) U.S. Cl.
   CPC ..................... *G05F 3/02* (2013.01)
(58) Field of Classification Search
   CPC ........................................ G05F 3/02
   USPC ................................ 307/125, 104
   See application file for complete search history.

(56) References Cited

U.S. PATENT DOCUMENTS

| 7,353,407 | B2 | 4/2008 | Diab et al. | |
|---|---|---|---|---|
| 2007/0242647 | A1 | 10/2007 | Bennett | |
| 2011/0166809 | A1* | 7/2011 | Gale | G01R 31/007 702/58 |
| 2012/0065807 | A1* | 3/2012 | Yokota | H02H 3/325 700/298 |
| 2012/0126819 | A1* | 5/2012 | Liu | H01M 10/48 324/427 |
| 2013/0339767 | A1 | 12/2013 | Kim et al. | |

OTHER PUBLICATIONS

Estimating the Length of Copper Wire. Hioki. 2016 [retrieved on Jun. 21, 2020]. Retrieved from the Internet: <URL: https://www.hioki.com/file/cmw/hdApplicationEn/113432/pdf/? action=browser &log=1 &lang=en> entire document.
International Search Report and Written Opinion, PCT Application No. PCT/US2020/027759, dated Jul. 17, 2020, 9 pages.

* cited by examiner

*Primary Examiner* — Tomi Skibinski
(74) *Attorney, Agent, or Firm* — Fountainhead Law Group P.C.

(57) ABSTRACT

In some implementations, a method is provided. The method may allow a powered device to determine the maximum power available from power supply equipment. The method includes determining the length of a cable connecting the powered device to the power supply equipment based on the resistance of the cable. The method further includes determining the maximum power available to the powered device based on the length of the cable. The powered device may then be operated based on the maximum power available.

20 Claims, 7 Drawing Sheets

MAXIMUM POWER DETECTION FOR POWERED DEVICES

BACKGROUND

Powered devices (PDs), such as access points, draw power from power supply equipment (PSE), such as switches. PSE may provide power and data to PDs via cabling of various types and lengths. The IEEE 802.3af specification standardizes cabling length, power output (by class) and other aspects of the PSE/PD infrastructure, to enable compatibility among different devices. For example, the IEEE 802.3af specification specifies that PSE can deliver limited power and data to PDs via CAT5 cables and that 30 watts and 100 meters is the standard power output and standard cabling length respectively. Although PSE may be rated for a specific power output, the actual power delivered to a PD is less depending on cable characteristics such as size and length as well as the amount of current through the cable.

SUMMARY

In some implementations, a powered device is provided. The powered device may comprise a memory and a processing device coupled to the memory. The powered device may determine the length of a cable connecting the powered device to power supply equipment based, at least in part, on a resistance of the cable. The processing device may determine, based on the length of the cable, a maximum power available to the powered device from the power supply equipment and operate the powered device based on the maximum power available.

In some implementations, a method is provided. The method includes determining the length of a cable connecting a powered device to power supply equipment based on the resistance of the cable. The method further includes determining the maximum power available to the powered device based on the length of the cable. The powered device may then be operated based on the maximum power available.

In some implementations, a non-transitory machine-readable medium is provided. The non-transitory machine-readable medium includes executable instructions to cause one or more processing devices to perform a method to determine the maximum power available to a powered device from power supply equipment. The method includes determining the length of a cable connecting the powered device to the power supply equipment based on the resistance of the cable. The method further includes determining the maximum power available to the powered device based on the length of the cable. The powered device may then be operated based on the maximum power available.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAIL ED DESCRIPTION

As discussed above, the IEEE 802.3af specification standardizes cabling length, power output (by class) and other aspects of the PSE/PD infrastructure, to enable compatibility among different devices. Although PSE may be rated for a specific power output, the actual power delivered to a PD is less depending on the cable characteristics such as size and length as well as the amount of current through the cable. For example, if PSE rated for 30 watts (W) is connected to a PD by a cable that is 100 meters in length, the actual power available to the PD may be 25.4 W. However, even when the length of the cable is less than 100 meters, owing to the standardized nature of PSE-PD infrastructure, a PD may automatically assume that it is connected to PSE by a 100 m cable, regardless of the actual length of the cable connecting the two. Therefore, although the actual amount of power loss (and thus the actual available power), is based on the length of the cable (among other factors), PDs may always assume a level of available power from the PSE based on being connected to the PSE by a 100 m cable. Because PDs limit the amount of power they draw from PSE based on assumed available power, and because PDs assume less power is available than may actually be available, they may operate less efficiently than they otherwise could.

Figure 1:
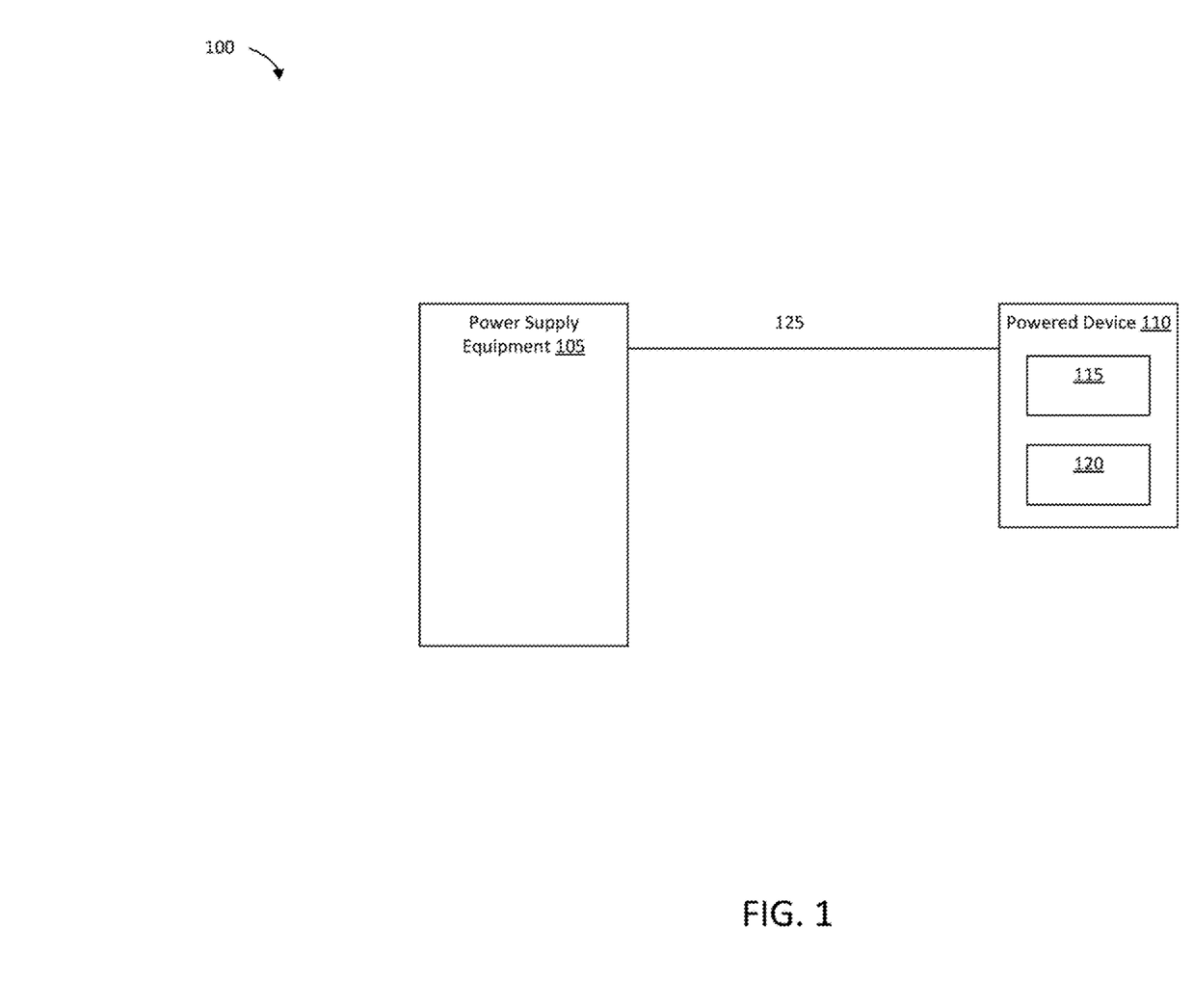
FIG. 1 is a block diagram illustrating an example of a system, in accordance with some embodiments of the present disclosure.

FIG. 1 is a block diagram of a system 100 that includes power supply equipment (PSE) 105 connected to a powered device (PD) 110 via a cable 125. PD 110 may be any device capable of drawing power from PSE 105 such as an access point, a smart phone, a smart exit sign, a WiFi repeater, or any other appropriate computing device. PD 110 may include a processing device 115 and a memory 120. PSE 105 may be any device capable of providing power and data to a powered device. For example, PSE 105 may be a switch, capable of providing power and data according to the Power Over Ethernet (POE) standard. PSE 105 may be a class 1 or class 2 device. Cable 125 may be any cable appropriate for carrying power and data to PD 110 such as CAT 5, CAT 6 or CAT6e for example. Cable 125 may be connected to PSE 105 and PD 110 using RJ45 connectors (not shown in the Figures) or any other suitable connector. Memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may store a cable length measurement module 120A which, when executed by processing device 115, may cause PD 110 to perform the operations described herein.

PD 110 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The PD 110 may comprise any suitable type of computing device or machine that has a programmable processor including, for example, server computers, desktop computers, laptop computers, tablet computers, smartphones, set-top boxes, etc. In some examples, the powered device 110 may comprise a single machine or may include multiple interconnected machines (e.g., multiple servers configured in a cluster). The PD 110 and the PSE 105 may be implemented by a common entity/organization or may be implemented by different entities/organizations. For example, the PD 110 may be operated by a first company/corporation and the PSE 105 may be operated by a second company/corporation. Both the PD 110 and the PSE 105 may execute or include an operating system (OS). The OS' of PD 110 and PSE 105 may manage the execution of other components (e.g., software, applications, etc.) and/or may manage access to the hardware (e.g., processors, memory, storage devices etc.).

PD 110 (e.g., via processing device 115) may execute cable length measurement module 120A to determine the length of cable 125 upon power up or during operation as discussed in further detail herein.

Figure 2:
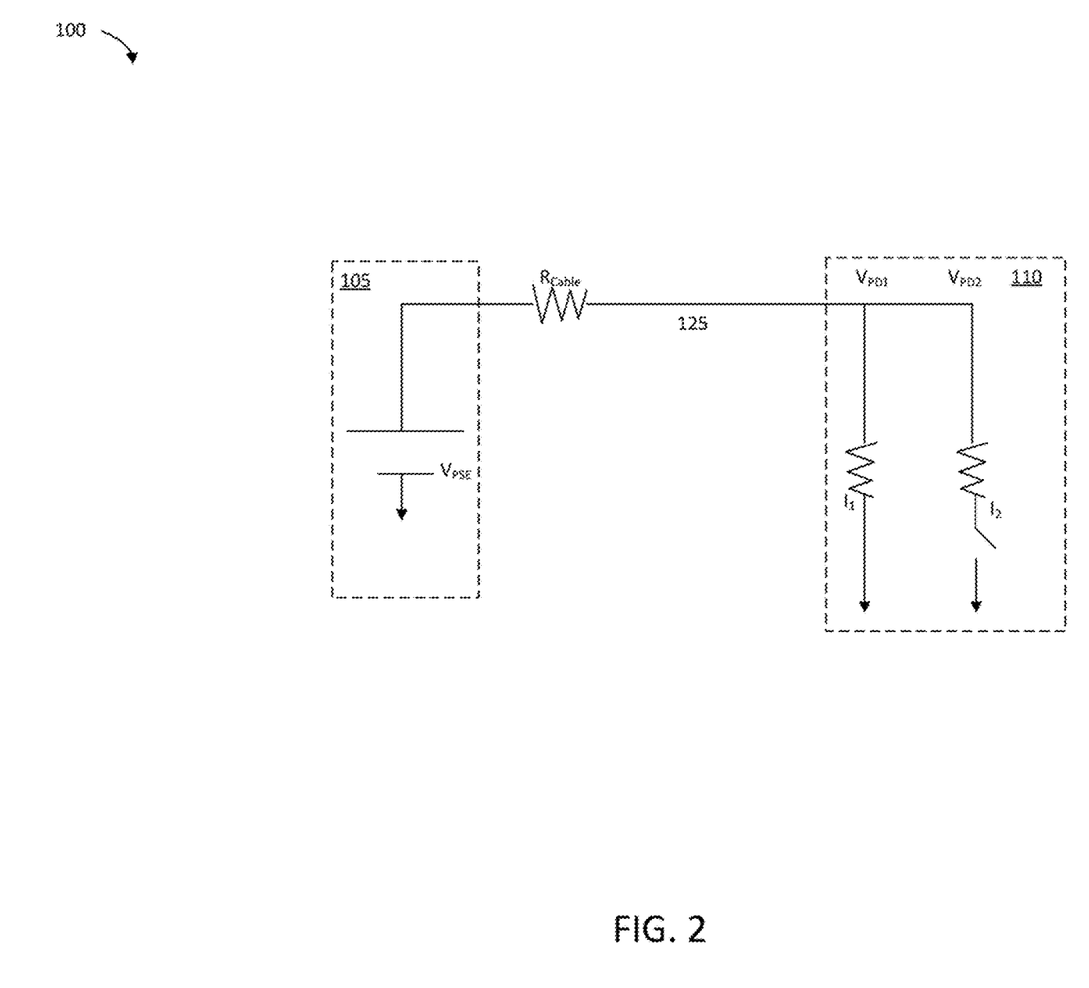
FIG. 2 is a circuit diagram illustrating an example of a circuit representation of the system of FIG. 1, in accordance with some embodiments of the present disclosure.
Figure 3:
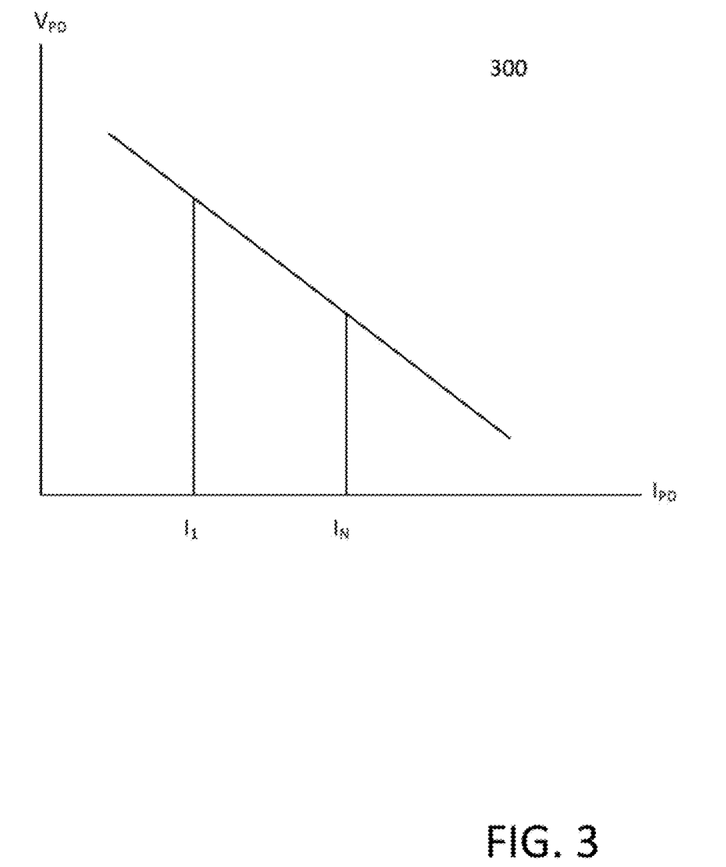
FIG. 3 is a graph illustrating the relationship between line voltage and current dissipating levels in a powered device, in accordance with some embodiments of the present disclosure.

FIG. 2 is a circuit representation of system 100 in accordance with some embodiments of the present disclosure. FIG. 2 illustrates the resistance of the cable 125 ($R_{Cable}$) as well as a first operating current ($I_1$) and a second operating current ($I_2$). $I_1$ may refer to the current dissipated by PD 110 when only the processing device 115 is active, and may be measured and stored in a memory of processing device 115 (e.g., EEPROM) during manufacture of the PD 110. $I_2$ may refer to the current dissipated by PD 110 when all the components of PD 110 are active (e.g., during normal operation). FIG. 3 illustrates a graph 300 of the current the PD 110 is dissipating ($I_{PD}$) versus the line voltage of the PD 110 ($V_{PD}$). As can be seen, the $V_{PD}$ may decrease as the $I_{PD}$ increases due to the increase in voltage drop as the $I_{PD}$ increases. Referring back to FIG. 2, in response to executing cable length measurement module 120A, PD 110 may measure the line voltage when it is dissipating $I_1$ ($V_{PD1}$). More specifically, processing device 115 may engage $I_1$ (stored in a memory of processing device 115) for the purpose of measuring $V_{PD1}$. PD 110 may circumvent the $I_2$ for the purposes of measuring VPD1, as indicated by the open switch shown in FIG. 2. PD 110 may include an analog to digital converter (not shown in the Figures), for measuring the line voltage. PD 110 may then disengage $I_1$ and measure the line voltage during normal operation when PD 110 is dissipating $I_2$ ($V_{PD2}$). As discussed above, $I_2$ represents the current when all of the components of PD 110 are operating (I.e. the switch shown in FIG. 2 would be closed).

PD 110 may calculate the resistance of the cable as a function of the $I_1$, $I_2$, $V_{PD1}$ and $V_{PD2}$ values. More specifically, PD 110 may generate 2 equations for the voltage of the power supply equipment ($V_{PSE}$):

$$V_{PSE1} = (I_1)(R_{Cable}) + V_{PD1} \qquad \text{EQ1:}$$

$$V_{PSE2} = (I_1 + I_2)(R_{Cable}) + V_{PDE} \qquad \text{EQ2:}$$

PD 110 may equate EQ1 and EQ2 (($I_1$) ($R_{Cable}$)+$V_{PD1}$ = ($I_1$+$I_2$) ($R_{Cable}$)+$V_{PD2}$) and solve for $R_{Cable}$. Upon determining $R_{Cable}$, PD 110 may determine the length of the cable 125 based on the $R_{Cable}$ as well as the resistance per meter (R/M) of cable 125. In some embodiments, the R/M of cable 125 may be stored in memory 120. PD 110 may determine the length of the cable 125 as:

$$LCable = \frac{RCable}{R/M} \qquad \text{EQ 3}$$

Upon determining the length of cable 125, PD 110 may determine the maximum available power that it may draw from PSE 105 as a function of $V_{PSE}$ and the length of the cable 125. More specifically, PD 110 may determine the power drop over the cable 125 ($P_{Dr}$). PD 110 may first determine the voltage drop over cable 125 ($V_{Dr}$) as:

$$V_{Dr} = (I_1 + I_2)(R_{Cable}) \qquad \text{EQ4:}$$

As EQ3 above indicates, as the length of the cable 125 increases the $R_{Cable}$ will also increase, thus resulting in a larger voltage drop. PD 110 may then determine the power drop as:

$$P_{Dr} = (V_{Dr})(I_1 + I_2) \qquad \text{EQ5:}$$

Processing device 115 may then subtract the $P_{Dr}$ from the rated power output of the PSE to determine the maximum available power. Based on the determined maximum available power, PD 110 may adjust the amount of power it draws from PSE 105 and operate at a higher power level. For example, assuming system 100 includes a PSE 105 providing 30 Watts (W) of power, standard powered devices may assume that cable 125 is 100 meters (M) long and thus that only 25.4 W is available and may operate based on having a maximum of 25.4 W available. However, PD 110 may, upon power up, determine the length of cable 125 as discussed herein, and determine that cable 125 is only 50M, and thus that 28.7 W is available, for example. PD 110 may then operate based on a 28.7 W power availability. In some embodiments, PD 110 may determine the maximum available power during operation. For example, PD 110 may be an access point, and may provide a signal based on the 25.4 W power availability. During operation, PD 110 may determine the maximum available power as 28.7 W as discussed herein. PD 110 may then boost its signal power based on the determined maximum available power (28.7).

Figure 4:
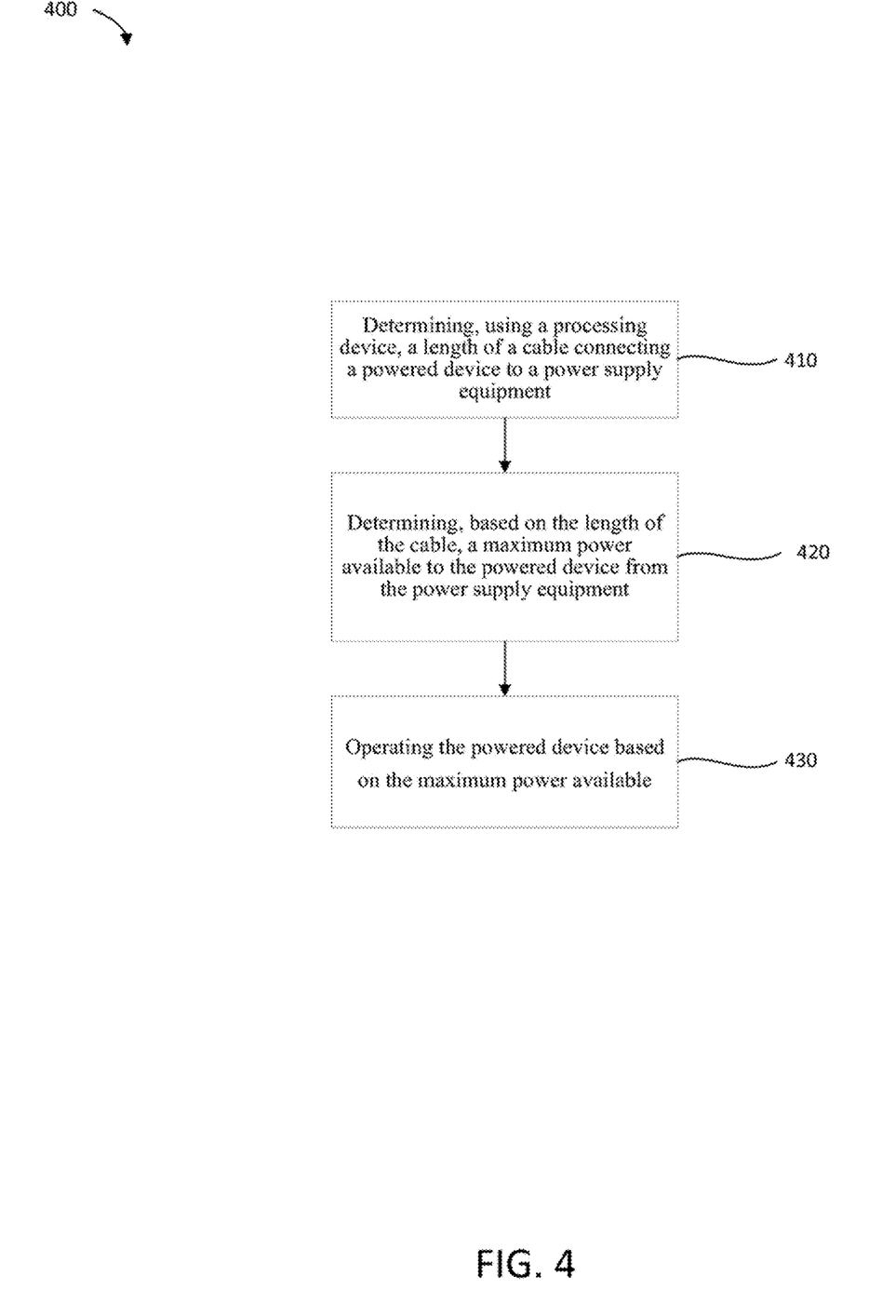
FIG. 4 is a flow diagram of a method for determining the maximum available power from PSE, in accordance with some embodiments of the present disclosure.

FIG. 4 illustrates a method 400 for determining the available maximum power available from power supply equipment. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a powered device (e.g., PD 110 illustrated in FIG. 1) executing cable length measurement module 120A. The method 400 may start at block 410, where PD 110 may determine the length of a cable connecting it to PSE 105. More specifically, PD 110 may determine the length of the cable based on the resistance of the cable (Described in more detail above and with respect to FIG. 5). At block 420, powered device 110 may determine the maximum available power from PSE 105 based on the length of the cable (Described in more detail above with respect to FIG. 2). At block 430, the powered device may operate based on the maximum power available. More specifically, powered device 110 may draw power based on the newly determined maximum available power. In some embodiments, powered device 110 may already be operating when the maximum power available is determined and may adjust the amount of power drawn from the power supply equipment based on the newly determined maximum available power. For example, powered device 110 may be an access point, and during operation may determine the maximum available power as described above. Based on the newly determined maximum power available, the access point may boost its signal power.

Figure 5:
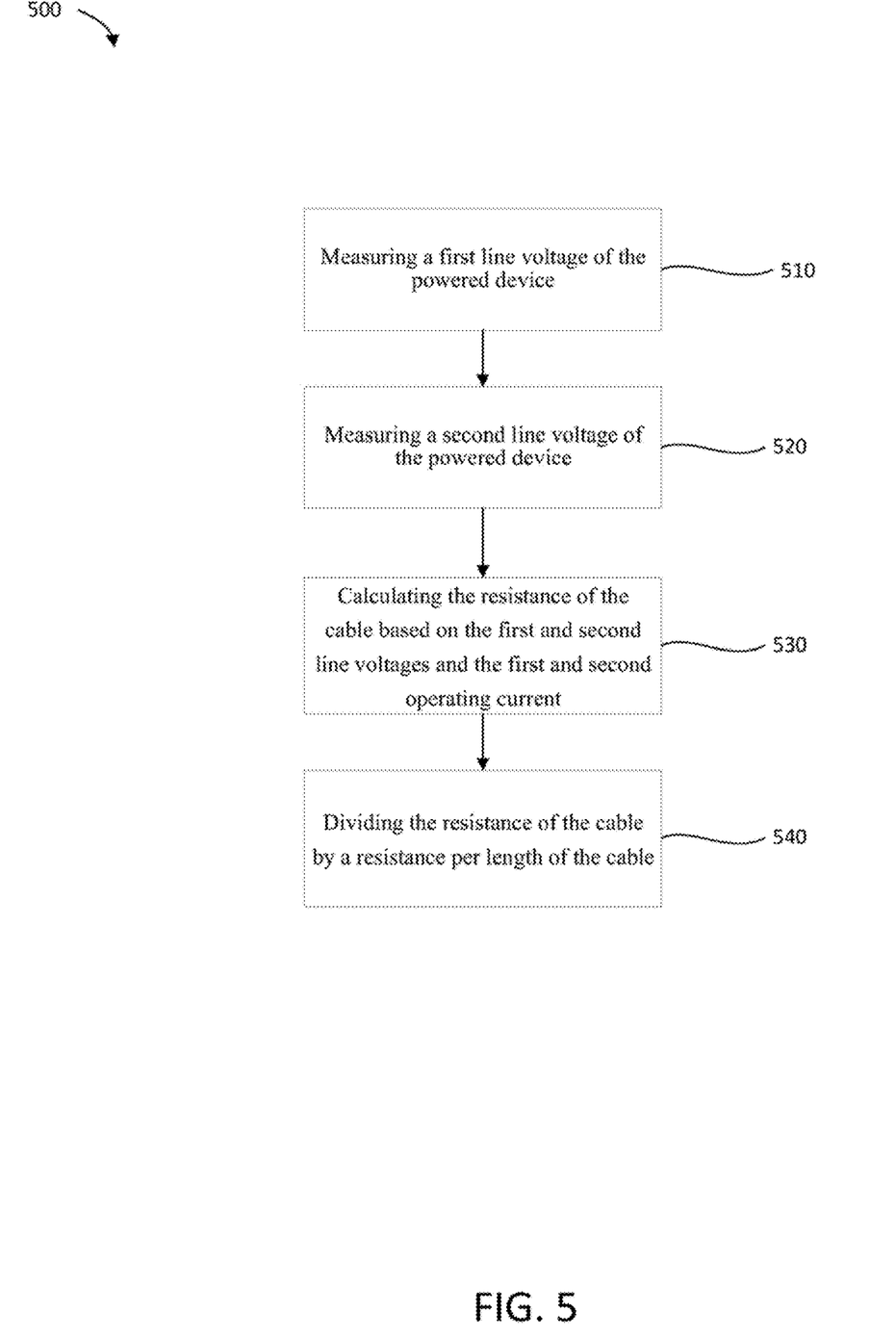
FIG. 5 is a flow diagram of a method for determining the length of a cable connecting a PD and PSE, in accordance with some embodiments of the present disclosure.

FIG. 5 illustrates a method 500 for determining the length of a cable according to some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a powered device (e.g., PD 110 illustrated in FIG. 1) executing cable length measurement module 120A. At block 510, PD 110 may measure the line voltage when it is dissipating $I_1$ ($V_{PD1}$). More specifically, processing device 115 may engage $I_1$ (stored in a memory of processing device 115) for the purpose of measuring $V_{PD1}$. PD 110 may circumvent the $I_2$ for the purposes of measuring VPD1, as indicated by the open switch shown in FIG. 2. PD 110 may include an analog to digital converter (not shown in the Figures), for measuring the line voltage. At block 520, PD 110 may then disengage $I_1$ and measure the line voltage during normal operation when PD 110 is dissipating $I_2$ ($V_{PD2}$). As discussed above, $I_2$ represents the current when all of the components of PD 110 are operating (I.e. the switch shown in FIG. 2 would be closed)

At block 530, PD 110 may calculate the resistance of the cable 125 based on the $I_1$, $I_2$, $V_{PD1}$, and $V_{PD2}$ as discussed above with respect to FIG. 2. At block 540, PD 110 may divide the resistance of the cable 125 by the resistance per length of the cable 125 (as discussed above) to obtain the length of the cable 125.

Figure 6:
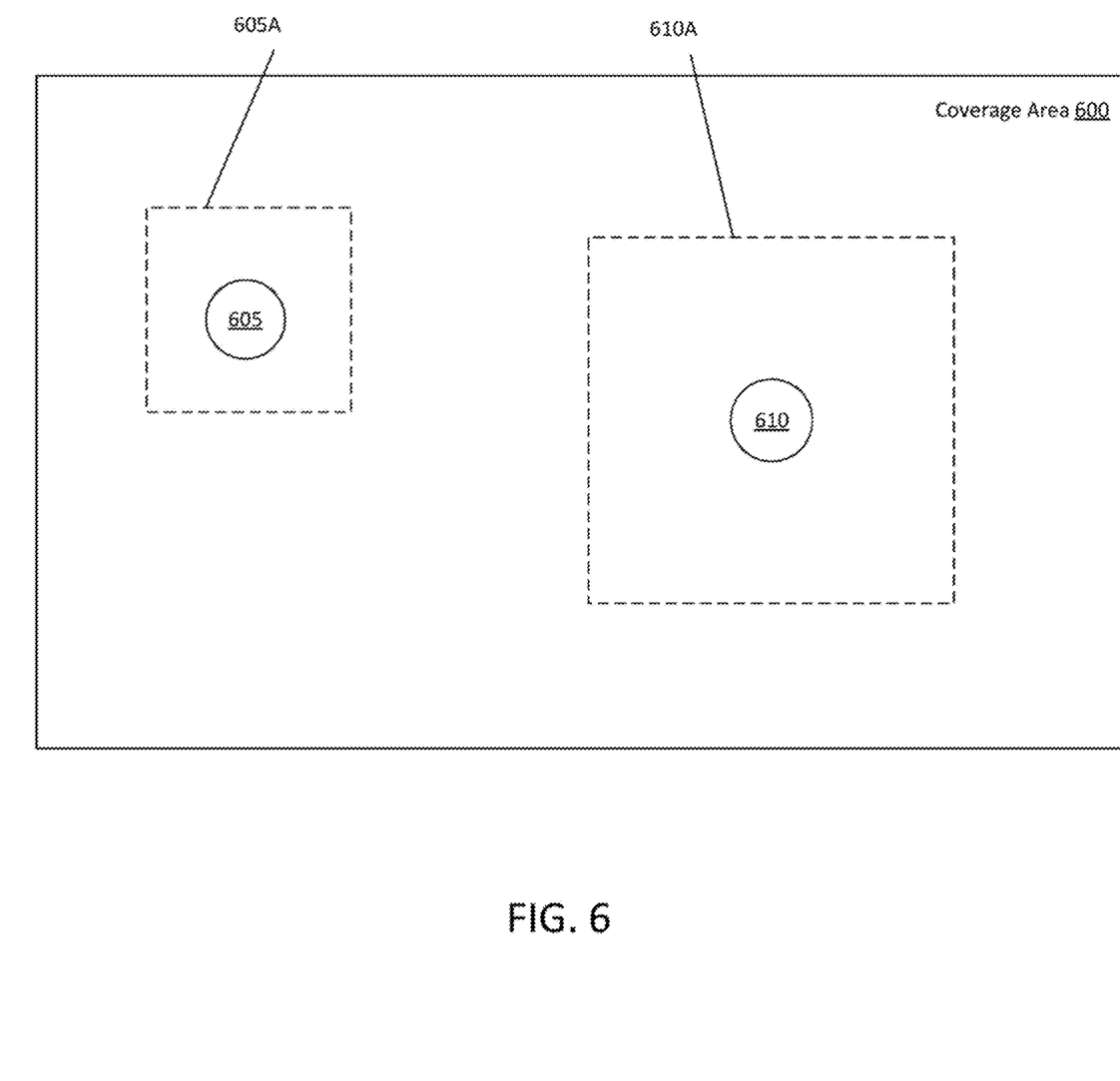
FIG. 6 is a diagram of a coverage area for access points, in accordance with some embodiments of the present disclosure.

FIG. 6 illustrates a coverage area 600 in which access points 605 and 610 are positioned. Coverage area 600 may represent an area for which WiFi coverage must be provided, for example. The coverage range of access point 605 is shown by 605A and the coverage range for access point 610 is shown by 610A. Power supply equipment (not shown in FIG. 6) may provide power to access points 605 and 610. Access point 605 may represent an access point drawing power from the PSE based on an assumption that the length of the cable is 100 M. However, upon power up, access point 610 may determine the length of the cable connecting it to the PSE as discussed herein and thus may determine the actual maximum power available from the PSE. Based on the actual maximum available power, access point 610 may draw more power from PSE than access point 605 and thus generate a higher signal power, thereby providing a greater area of coverage 610A. In some embodiments, access point 610 may determine the maximum available power during operation and boost the signal power based on the determined maximum available power.

A person configuring a network in a coverage area, such as coverage area 600 may use the embodiments described herein to determine the most efficient number of access points required as well as the most efficient places for the access points to be positioned.

Figure 7:
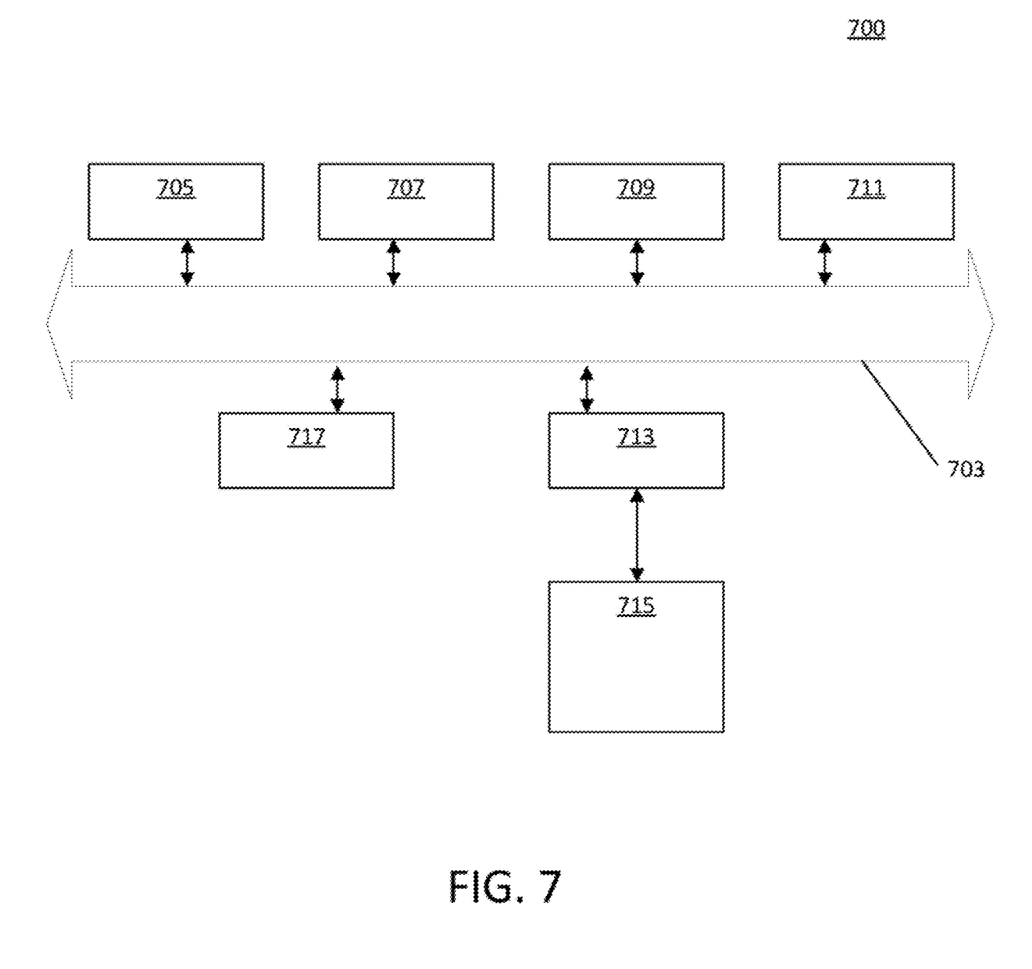
FIG. 7 is a block diagram of a powered device, in accordance with some embodiments of the present disclosure.

FIG. 7 shows an example of a powered device 700, in accordance with some embodiments of the present disclosure. For example, the powered device 700 may be implemented including powered device 110 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the powered device 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. In one embodiment, the computing device 500 includes a plurality of network interfaces of the same or different type (e.g., Ethernet copper interface, Ethernet fiber interfaces, wireless, and/or other types of network interfaces). In this embodiment, the powered device 700 can include a forwarding engine to forward network data received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD ROM/RAM or a flash memory or other types of memory systems, which maintains data (e.g., large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instruction such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside don, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two blocks in a figure shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    determining, using a processing device in a powered device, a length of a cable connecting the powered device to a power supply equipment based, at least in part, on a resistance of the cable;
    determining, using the processing device in the powered device, a power drop along the length of the cable based, at least in part, on the length of the cable;
    determining, using the processing device in the powered device, maximum power available ($P_{avail}$) to the powered device from the power supply equipment based at least in part on the power drop along the length of the cable by subtracting the power drop along the length of the cable from a power output of the power supply equipment; and
    performing, by the powered device, operations at a power substantially equal to $P_{avail}$, including receiving power on the cable substantially equal to $P_{avail}$ from the power supply equipment.

2. The method of claim 1, wherein determining the length of the cable comprises:
    determining the resistance of the cable;
    dividing the resistance of the cable by a resistance per length of the cable to obtain the length of the cable.

3. The method of claim 2, wherein determining the resistance of the cable comprises:
    measuring a first line voltage of the powered device based on a first operating current of the powered device;
    measuring a second line voltage of the powered device based on a second operating current of the powered device; and
    calculating the resistance of the cable based, at least in part, on the first line voltage, the second line voltage, the first operating current, and the second operating current.

4. The method of claim 1, wherein operating the powered device based on the maximum power available comprises adjusting an amount of power drawn from the power supply equipment based on the maximum power available.

5. The method of claim 1, wherein the length of the cable is determined upon power-up of the powered device.

6. The method of claim 1, wherein the length of the cable is determined during operation of the powered device.

7. The method of claim 6, wherein the powered device is an access point, and wherein operating the access point based on the maximum power available comprises boosting a signal power of the access point based on the maximum power available.

8. A powered device comprising:
    a memory;
    a processing device coupled to the memory, the processing device to:
    determine a length of a cable connecting the powered device to a power supply equipment based, at least in part, on a resistance of the cable;
    determine a power drop along the length of the cable based, at least in part, on the length of the cable;
    determine a maximum power available ($P_{avail}$) to the powered device from the power supply equipment based at least in part on the power drop along the length of the cable by subtracting the power drop along the length of the cable from a power output of the power supply equipment; and
    perform operations at a power substantially equal to $P_{avail}$, including receiving power on the cable substantially equal to $P_{avail}$ from the power supply equipment.

9. The powered device of claim 8, wherein to determine the length of the cable, the processing device is further to:
    determine the resistance of the cable;
    divide the resistance of the cable by a resistance per length of the cable to obtain the length of the cable.

10. The powered device of claim 9, wherein to determine the resistance of the cable, the processing device is further to:
    measure a first line voltage of the powered device based on a first operating current of the powered device;
    measure a second line voltage of the powered device based on a second operating current of the powered device; and
    calculate the resistance of the cable based, at least in part, on the first line voltage, the second line voltage, the first operating current, and the second operating current.

11. The powered device of claim 8, wherein to operate the powered device based on the maximum power available, the processing device is further to adjust an amount of power drawn from the power supply equipment based on the maximum power available.

12. The powered device of claim 8, wherein the processing device determines the length of the cable upon power-up of the powered device.

13. The powered device of claim 8, wherein the processing device determines the length of the cable during operation of the powered device.

14. The powered device of claim 8, wherein the powered device is an access point, and wherein to operate the access point based on the maximum power available, the processing device is configured to boost a signal power of the access point based on the maximum power available.

15. A non-transitory machine-readable medium having executable instructions to cause one or more processing devices to perform a method, the method comprising:

determining, using a processing device in a powered device, a length of a cable connecting the powered device to a power supply equipment based, at least in part, on a resistance of the cable;

determining, using the processing device in the powered device, a power drop along the length of the cable based, at least in part, on the length of the cable;

determining, using the processing device in the powered device, a maximum power available ($P_{avail}$) to the powered device from the power supply equipment based at least in part on the power drop along the length of the cable by subtracting the power drop along the length of the cable from a power output of the power supply equipment; and performing, by the powered device, operations at a power substantially equal to $P_{avail}$, including receiving power on the cable substantially equal to $P_{avail}$ from the power supply equipment.

16. The non-transitory machine-readable medium of claim 15, wherein determining the length of the cable comprises:

determining the resistance of the cable;

dividing the resistance of the cable by a resistance per length of the cable to obtain the length of the cable.

17. The non-transitory machine-readable medium of claim 16, wherein determining the resistance of the cable comprises:

measuring a first line voltage of the powered device based on a first operating current of the powered device;

measuring a second line voltage of the powered device based on a second operating current of the powered device; and calculating the resistance of the cable based, at least in part, on the first line voltage, the second line voltage, the first operating current, and the second operating current.

18. The non-transitory machine-readable medium of claim 15, wherein operating the powered device based on the maximum power available comprises adjusting an amount of power drawn from the power supply equipment based on the maximum power available.

19. The non-transitory machine-readable medium of claim 15, wherein the length of the cable is determined during operation of the powered device.

20. The non-transitory machine-readable medium of claim 19, wherein the powered device is an access point, and wherein operating the access point based on the maximum power available comprises boosting a signal power of the access point based on the maximum power available.

* * * * *